United States Patent
Caspar et al.

(10) Patent No.: US 6,811,071 B2
(45) Date of Patent: Nov. 2, 2004

(54) METHOD FOR THE MANUFACTURE OF A METAL STRUCTURE AND DEVICE FOR WETTING A METAL STRUCTURE WITH AN ADHESIVE

(75) Inventors: Hans-Peter Caspar, Troisdorf (DE); Ferdi Kurth, Mechernich (DE); Michael Voit, Leverkusen (DE); Christoph Müller, Overath (DE); Alexander Scholz, Bonn (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 184 days.

(21) Appl. No.: 10/273,523

(22) Filed: Oct. 18, 2002

(65) Prior Publication Data

US 2003/0075590 A1 Apr. 24, 2003

(30) Foreign Application Priority Data

Oct. 18, 2001 (DE) .......................................... 101 51 487

(51) Int. Cl.$^7$ ............................. B23K 31/02; B05D 5/10
(52) U.S. Cl. ........................ 228/182; 228/181; 228/183; 427/207.1; 118/300
(58) Field of Search ................................. 228/181, 182, 228/258, 183; 427/207.1; 118/300; 222/547, 564

(56) References Cited

U.S. PATENT DOCUMENTS

| 3,797,946 A | * | 3/1974 | Witzmann et al. ........... 401/116 |
| 5,082,167 A | * | 1/1992 | Sadano et al. .............. 228/258 |
| RE35,063 E | | 10/1995 | Sadano et al. |
| 6,616,019 B2 | * | 9/2003 | D'Alessio et al. .......... 222/566 |
| 2003/0077386 A1 | * | 4/2003 | Azevedo .................. 427/207.1 |

FOREIGN PATENT DOCUMENTS

EP 0 474 909 B1 3/1992

* cited by examiner

*Primary Examiner*—L. Edmondson
(74) *Attorney, Agent, or Firm*—Laurence A. Greenberg; Werner H. Stemer; Ralph E. Locher

(57) ABSTRACT

A method for manufacturing a metal structure in which the metal structure has separate walls forming channels through which a fluid can flow includes at least partially wetting the walls inside the channels with an adhesive, bringing the metal structure into contact with a solder that adheres to the adhesive, and carrying out a heat treatment to form soldered connections between the separate walls. The method is distinguished by the fact that the dosed delivery of the adhesive is performed by at least one dosing element having a honeycomb configuration and having an inlet side (8) and an outlet side, the element being connected to the adhesive. The adhesive enters the dosing element through the inlet side and is uniformly distributed into the channels through the outlet side. The invention also includes a device for wetting the metal structure with the adhesive.

24 Claims, 4 Drawing Sheets

METHOD FOR THE MANUFACTURE OF A METAL STRUCTURE AND DEVICE FOR WETTING A METAL STRUCTURE WITH AN ADHESIVE

BACKGROUND OF THE INVENTION

Field of the Invention

The present invention relates to a method for the manufacture of a metal structure that includes separate walls, which form channels through which a fluid can flow. The walls inside the channels are at least partially wetted with an adhesive. The metal structure is, then, brought into contact with a solder, which adheres to the adhesive, a heat treatment then being carried out to form soldered connections between the separate walls. A device for wetting a metal structure with an adhesive is furthermore described with the device including an adhesive reservoir that is connected to at least one dosing element through which the adhesive can flow.

Such metal structures are preferably used as catalyst carrier substrate in exhaust systems of mobile internal combustion engines. For such use and in order to obtain a highly efficient catalytic conversion of pollutants in the exhaust gas, it is necessary to provide the metal structure with the largest possible catalytically active contact surface. For this reason, a development trend toward high channel densities and very thin channel walls has emerged in recent years. The use of very thin channel walls, especially ones of high temperature and corrosion-resistant metal foils, means, however, that the joining technology used to connect the channels walls together must take account of the high thermal and dynamic stresses occurring in the exhaust system of an automobile. Thus, to ensure a compensatory expansion due to the heat, for example, it is necessary to connect at least some of the channel walls together only in a predefinable axial section so that continuous joining over the entire length of the channels is avoided. At the same time, the limits of such a joined section are to be adhered to as precisely as possible.

A further increase in the catalytically active surface is achieved by coating the relatively smooth channel walls with a so-called washcoat, which has a highly fissured surface. The fissured surface, on one hand, ensures a sufficiently large area for the fixing of catalytically active constituents (platinum, rhodium, etc., are used as catalysts, for example), and, on the other hand, serves to swirl the exhaust gas flowing through, thereby producing an especially intensive contact with the catalyst. Application of the washcoat results in a further reduction of the free-flow cross section, however, which, particularly in the case of high channel densities, can lead to an undesirable pressure drop over the catalyst carrier substrate. In this respect, it is quite important to place solder material only at the contact points of each of the channel walls, in order not to increase the height of the coating (solder plus washcoat) on top of the channel wall unnecessarily.

The washcoat is generally composed of a mixture of an aluminum oxide of the transition series and at least one promoter oxide, such as a rare earth oxide, zirconium oxide, nickel oxide, iron oxide, germanium oxide, and barium oxide, for example. The catalytic top-surface washcoat layer is applied in a conventional manner by dipping the honeycomb monolith in a liquid washcoat dispersion or spraying it therewith. The excess washcoat dispersion is, then, removed, and the washcoat in the, preferably, honeycomb catalyst substrate is dried and then calcined at temperatures usually in excess of 450° C. During the calcining, the volatile constituents of the washcoat dispersion and constituents of any bonding agent or adhesive are expelled to produce a temperature-resistant and catalytic layer with high specific surface. If necessary, such a process is repeated several times to achieve a desired layer thickness.

A method for the manufacture of such a catalyst carrier substrate is disclosed, for example, by U.S. Pat. No. 5,082,167 to Sadano et al., and U.S. Pat. Reexamination No. RE35,063 to Sadano et al. These documents describe, in particular, the technical problems relating to the dosing and application of a solder to a honeycomb monolith structure. It is explained, for example, that excessive use of solder with inaccurate application of adhesive leads to corrosion in the metal foil, care needing to be taken to ensure that the adhesive or the bonding agent is placed only at the contact points of the metal foils. It is also stated that any application of the solder prior to a sheet metal foil winding or layering operation is unsuitable because, on one hand, the final diameter of the honeycomb monolith cannot be precisely set due to the grains of solder between the sheet metal foils, and gas can sometimes occur between adjacent sheet metal foils due to subsequent fluidization of the grains of solder. Spraying the catalyst carrier substrate with a bonding agent has also proved ineffective because it is very difficult to get a nozzle close to the corresponding joining areas inside the channels.

U.S. Pat. No. 5,082,167 to Sadano et al., and U.S. Pat. Reexamination No. RE35,063 to Sadano et al. propose to manufacture a catalyst carrier substrate with a honeycomb structure by layering and winding flat and corrugated sheet metal foils. Such a honeycomb structure is, then, brought into contact at the end face with a suction sponge. The suction sponge is disposed in a vessel containing a bonding agent or an adhesive and is saturated thereby. When the honeycomb structure is placed on the suction sponge, the bonding agent from inside the suction sponge penetrates into the interior of the channels through capillary action. After reaching the required height of capillary rise, the end face of the honeycomb structure is removed from the suction sponge. If necessary, such a process can be repeated from the other end face of the honeycomb structure.

It is stated with regard to the suction sponge, that this ensures a continuous supply of sufficient bonding agent because the suction sponge can always absorb bonding agent from one side of the bonding agent reservoir and can deliver it to another surface. However, the suction sponge does have a multiplicity of pores and passages, which, in each case, have greatly varying flow cross sections. This means that a very even supply of bonding agent to the surface on which the metal structure is placed cannot be ensured. Moreover impurities that occur in the production of such metal structures and are deposited on the suction sponge or in the bonding agent reservoir mean that the quality of the dosing may increasingly deteriorate. This would result, for example, in frequent interruptions to production because the suction sponge has to be frequently cleaned or replaced. If this is not done, catalyst carrier substrates of highly variable quality, in terms of their joining technology and hence, their durability, will be produced, which cannot be tolerated in automobile manufacturing or exhaust systems.

SUMMARY OF THE INVENTION

It is accordingly an object of the invention to provide a method for the manufacture of a metal structure and device for wetting a metal structure with an adhesive that overcome the hereinafore-mentioned disadvantages of the heretofore-known devices and methods of this general type and that specify a device, in which a precisely dosed and highly uniform delivery of adhesive to a metal structure is guaranteed. In so doing particular account must be taken of the technical production problems involved in the manufacture of such a catalyst carrier substrate for automobile manufacturing so that the method and the device are at least suitable for mass production with regard to production quality, production costs and product quality.

With the foregoing and other objects in view, there is provided, in accordance with the invention, a method for manufacturing a metal structure having separate walls forming channels through which a fluid can flow, including the steps of at least partially wetting walls inside the channels with an adhesive by performing a dosed delivery of the adhesive with at least one honeycomb configured dosing element having an inlet side and an outlet side and being connected to the adhesive, the adhesive entering the dosing element through the inlet side and being uniformly distributed into the channels through the outlet side, subsequently contacting the metal structure with a solder adhering to the adhesive, and carrying out a heat treatment to form soldered connections between the separate walls.

The method according to the invention relates to the manufacture of a metal structure that includes separate walls that form channels through which a fluid can flow and that inside the channels are at least partially wetted with an adhesive. The metal structure is, then, brought into contact with a solder, which adheres to the adhesive. A heat treatment is, then, carried out to form soldered connections between the separate walls. The method is characterized in that the dosed delivery of the adhesive is undertaken by at least one dosing element of a honeycomb configuration having an inlet side and an outlet side and in contact with the adhesive. In the process, the adhesive passes into the dosing element through the inlet side and is delivered uniformly into the channels of the metal structure through the outlet side.

The dosing element described here differs substantially from the suction sponge existing in the state of the art. Thus, it follows from the honeycomb structure, for example, that the dosing element has a uniform structure over its cross-section. Such structure ensures that the same quantity of adhesive is always supplied on the outlet side. It is furthermore advantageous that the proposed dosing element is also able to make use of capillary action. This means that, in the feed lines defined by the honeycomb structure, the adhesive can rise from the inlet side toward the outlet side even against the force of gravity. The dosing element, configured such that use can also be made of capillary action here as in the case of the metal structure, is of particular importance with regard to mass production because the flow characteristics of the adhesive or bonding agent have to be adapted solely with regard to such an affect. This means that the adhesive has a very similar or even identical flow behavior in the dosing element and in the metal structure, and can be precisely adjusted, where appropriate, through the temperature of the dosing element. This is a decisive advantage compared to the state of the art suction sponge, in which the adhesive or the bonding agent must also penetrate through porous intermediate walls. In this respect, the dosing element proposed here can readily be configured for processing reliability and can be precisely controlled.

In accordance with another mode of the invention, the metal structure is a honeycomb monolith, the walls of which are formed by at least partially structured sheet metal foils, the sheet metal foils being stacked and/or wound to form the honeycomb monolith such that the sheet metal foils define channels. The honeycomb monolith represents a very stable structure, which will also stand up to the thermal and dynamic demands in an exhaust system of an automobile. The honeycomb-like structure, accordingly, permits the use of ever thinner sheet metal foils while still ensuring an adequate service life. With regard to the method proposed, the dosing can be more precisely specified because the construction of the metal structure substantially corresponds to that of the dosing element.

In accordance with a further mode of the invention, it is further proposed to provide the dosing element with feed lines constructed substantially parallel with an axis, the channels of the metal structure likewise being aligned parallel to the axis, before the metal structure is brought into contact with the outlet side of the dosing element. The direction of flow of the adhesive is, therefore, substantially maintained due to the capillary action so that a uniform distribution of adhesive inside the channels of the metal structure is ensured.

In accordance with an added mode of the invention, the flow cross-sections of the metal structure and of the dosing element are matched to one another. For such a purpose the metal structure has at least one end face with a channel density that adjoin the channels having a predetermined channel cross-section. It is advantageously proposed that the dosing element be configured with a feed line density that is at least as great as the channel density. Such a configuration affords the facility for aligning the channel walls of the metal structure precisely with the feed line walls of the dosing element so that an interruption of the capillary action at the end face of the metal structure is avoided. This is achieved by having each channel of the metal structure overlap at least one feed line of its "own," preferably, completely. At the same time, for different channel densities or channel cross-sectional shapes, it is possible to use a different dosing element specially adapted to such an application and having a corresponding feed line density or a corresponding feed line cross-sectional shape.

In accordance with an additional mode of the invention, the adhesive is actively pumped into the inlet side of the dosing element. This means that, in addition or as an alternative to the spontaneous capillary action, energy is applied to deliver the adhesive through the feed lines of the dosing element. A number of prior art pump systems, such as piston pumps, positive displacement pumps, gear pumps, vane pumps, (rotary) swash plate pumps, gate and roller vane pumps, or the like are suitable for such a purpose. Such pump systems may be disposed between an adhesive reservoir and the dosing element, for example. It is, likewise, possible to use additional media to generate a pumping action. Thus, for example, the air pressure or atmospheric pressure in the adhesive reservoir may be increased to assist the flow of adhesive through the dosing element. Such active pumping may take place before, during, and/or after contact of the metal structure with the dosing element. This makes it possible, therefore, not only to assist the wetting process itself but also, for example, to flood the dosing element to clean the dosing element.

In accordance with yet another mode of the invention, the direction of flow of the adhesive in the dosing element is in the direction of gravitational force. Such a configuration affords two advantages. On one hand, the gravitational force assists the flow of the adhesive through the dosing element and the metal structure so that an active pumping assistance in the feed lines of the dosing system is, thereby, achieved. On the other hand, the method allows the metal structures, which are usually transported from one processing station to the next on conveyor belts or in holding fixtures, to be wetted with adhesive from above and/or in an upright position, for example. This is particularly advantageous where such catalyst carrier substrates are to be soldered and joined from one end face only. As such, expensive and complicated lifting and turning fixtures for orienting the metal structure in relation to the prior art suction sponges are avoided. It is sometimes advisable, however, for the direction of flow of the adhesive in the dosing element to run transversely or even counter to the direction of gravitational force. Orientation of the dosing element transversely to the direction of gravitational force is advisable, for example, in the case of metal structures that have a non-plane end face, in particular, a tapered or telescoped end face. If a metal structure is to be provided with adhesive from two opposing end faces, a combined simultaneous wetting is possible, two dosing elements being provided, which each produce an opposing direction of flow of the adhesive, in particular, one parallel to the direction of gravitational force.

In accordance with yet a further feature of the invention, the height of capillary rise of the adhesive in the channels of the metal structure is adjusted by way of the period of contact with the dosing element. This is based on the finding that due to the capillary action and/or the active pumping assistance, the adhesive has a rate of flow that is virtually constant. As such, it is possible to determine the length of time for which the metal structure must be brought into contact with the dosing element in order to obtain a height of capillary rise from the end face of the metal structure. The height of capillary rise may, on one hand, extend over the entire axial length of the metal structure or of the channels. However, a height of capillary rise that only extends over a part of the axial length is particularly advantageous in the case of metal structures that are subject to great thermal stresses in use. As such, for example, no more than the first 30 mm, and, in particular, only the first 20 mm from the end face of the metal structure are provided with adhesive. This also defines the area in which the soldering compound remains adhering and in which after heat treatment a joined connection is formed.

With the objects of the invention in view, there is also provided a device for wetting a metal structure with an adhesive, including an adhesive reservoir for supplying the adhesive and at least one honeycomb-shaped dosing element having an inlet side and an outlet side through which the adhesive can flow, the dosing element being fluidically connected to the adhesive reservoir, receiving the adhesive through the inlet side, and uniformly delivering the adhesive to the metal structure through the outlet side.

In accordance with yet an added feature of the invention, there is provided a device for wetting a metal structure with an adhesive. The device includes an adhesive reservoir that is connected to at least one dosing element through which the adhesive can flow. According to the invention, the dosing element has a honeycomb configuration with an inlet side and an outlet side, the adhesive entering the dosing element through the inlet side and being deliverable very uniformly to the metal structure through the outlet side. As already stated above, the honeycomb configuration of the dosing element is particularly advantageous because, with such a configuration, adhesive flow characteristics can be achieved that are particularly easy to monitor and adjust. This is of great importance particularly with regard to the production of metal structures as catalyst carrier substrate in automobile manufacture.

In accordance with yet an additional feature of the invention, it is further proposed that the dosing element have feed lines running substantially parallel to an axis that extends up to a substantially planar outlet side preferably disposed perpendicular to the axis. The outlet side is substantially planar to ensure an adequate contact between the dosing element and the metal structure. It may also, sometimes, be advantageous to make the outlet side not with a planar form but configured as an inverse shape to the end face of the metal structure.

In accordance with again another feature of the invention, the dosing element should have a feed line density of 200 cpsi to 2000 cpsi (cells per square inch), in particular, from 600 cpsi to 1600 cpsi. This makes it possible to use dosing elements adapted to the metal structure to be wetted, using substantially the same channel or feed line densities.

In accordance with again a further feature of the invention, the dosing element has metal foils that are at least partially structured so that they form feed lines through which the adhesive can flow. The metal foils, preferably, have a foil thickness of less than 80 $\mu$m, in particular, less than 50 $\mu$m and, most preferably, even less than 30 $\mu$m. In the case of particularly high channel densities, in excess of 1000 cpsi, for example, it may be necessary to use even thinner foil thicknesses, particularly, in a range between 12 $\mu$m and 20 $\mu$m, or as low as 8 $\mu$m. Making such dosing elements with metal foils permits the formation of separate, continuous channels, it being possible to keep the cross-sectional shape of the channels virtually exact over the length of the channels. The relatively smooth channel walls offer no scope for the accumulation of particles or impurities, which adhere to the metal structure, for example, and drop off when the dosing element is attached. This leads to a very uniform delivery of adhesive, viewed from the outlet side of the dosing element.

In accordance with again an added feature of the invention, it is proposed to provide the dosing element with a cover that extends over the outlet side and is pervious to the adhesive. A velvet cover, which is stretched over the outlet side of the dosing element, is suitable for such a purpose, for example. This prevents the metal structure or the dosing element from being damaged when they come into contact, for example. It also prevents impurities or dirt particles present on the metal structure from penetrating to the interior of the dosing element, thereby further minimizing any blockage of the feed lines. The cover here also serves to distribute the adhesive emerging from the feed lines over the end edges of the channel walls that is substantially transversely to the direction of flow. This results in an even more uniform distribution of the adhesive on the outlet side. By way of clarification, it is significant to note that the cover does not come into direct contact with the adhesive, but that the dosing element always serves for delivery of the adhesive. The cover height is, consequently, relatively small in relation to the length of the feed lines, the height, in particular, being up to 3 mm and, preferably, even only 1 mm. In this respect, the cover has a very small storage volume that is not capable, for example, of meeting the entire adhesive requirement of the metal structure.

In accordance with again an additional feature of the invention, providing the device with a pumping facility, which delivers the adhesive from the solder reservoir to the dosing device, is particularly advantageous. A number of pumping or delivery systems exist in the state of the art, which are particularly suitable for delivering very small quantities of a fluid, may be used as a pumping facility. Examples of such systems have already been quoted in explaining the method.

In accordance with still another feature of the invention, the device has a regulating facility that regulates the quantity of adhesive delivered to the dosing element. The duration of contact, the duration of the active pumping sequence, the type of adhesive, the temperature of the adhesive, of the metal structure and/or of the dosing element, and the densities and cross-sectional shapes of the channels or feed lines, for example, are suitable control variables.

In accordance with a concomitant feature of the invention the dosing element is moveable and is selectively fluidically connected to the adhesive reservoir.

Other features that are considered as characteristic for the invention are set forth in the appended claims.

Although the invention is illustrated and described herein as embodied in a method for the manufacture of a metal structure and device for wetting a metal structure with an adhesive, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
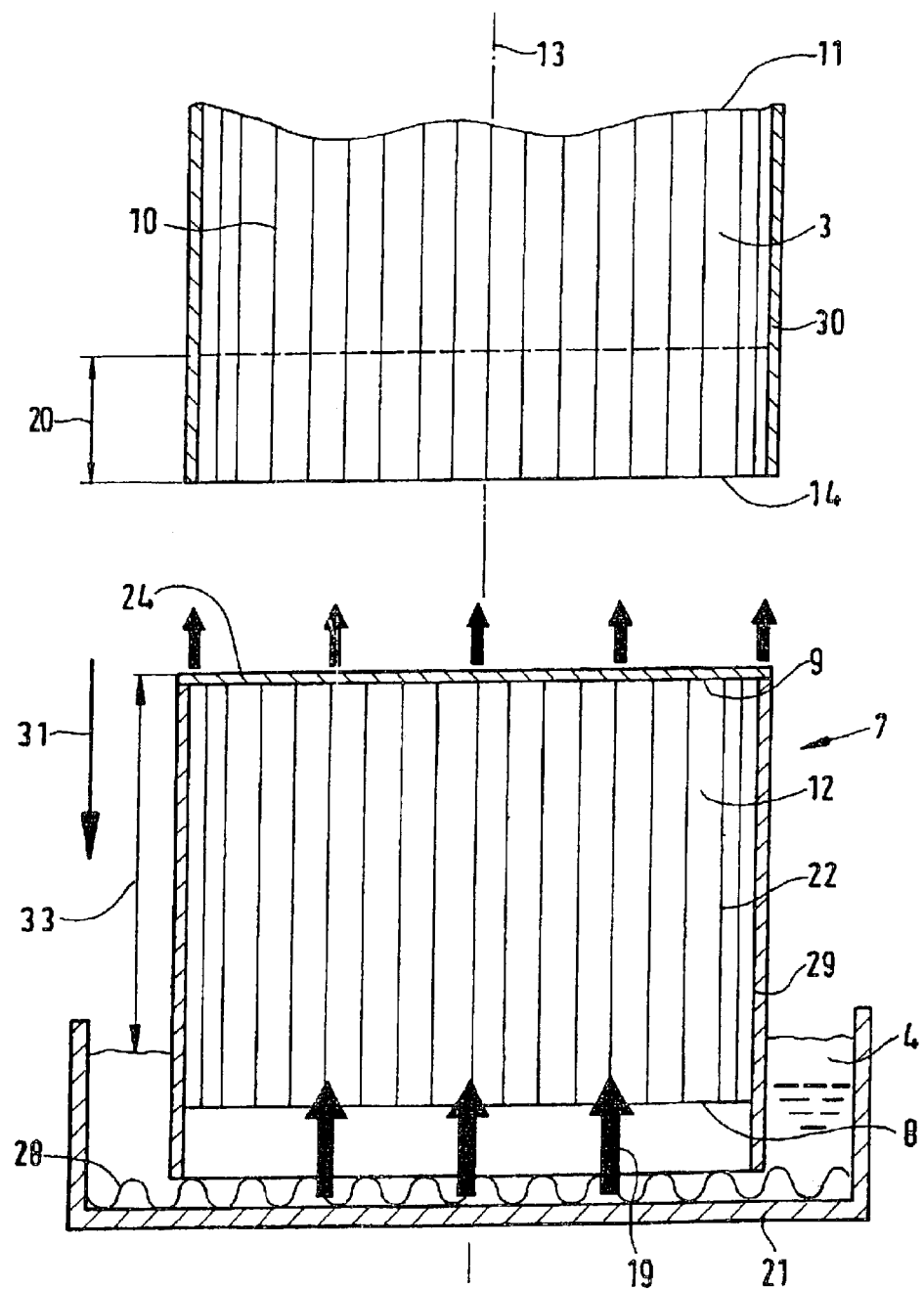
FIG. 1 is a fragmentary, cross-sectional view of a device according to the invention and a metal structure.

Referring now to the figures of the drawings in detail and first, particularly to FIG. 1 thereof, there is shown a diagrammatic cross-section through an embodiment of the device for wetting a metal structure with an adhesive 4. The metal structure is configured as a honeycomb monolith 11 that has a plurality of stacked and wound sheet metal foils 10, which are at least partially structured so that channels 3 are formed, through which a fluid, in particular, an exhaust gas can flow.

The honeycomb monolith 11 also includes a housing 30, which encloses the sheet metal foils 10. To form a connection joining the sheet metal foils 10 together and the sheet metal foils 10 to the housing 30, the honeycomb monolith 11 is wetted with an adhesive 4 to a height of capillary rise 20 from one end face 14. In a subsequent soldering process, the (especially powdered) solder 5 (not shown in FIG. 1), consequently, adheres to the adhesive 4 inside the channels 3 up to the height of capillary rise 20. Following heat treatment, the sheet metal foils 10 are, therefore, soldered, especially, high-temperature vacuum soldered to one another and also to the housing 30.

To obtain a constant height of capillary rise 20 in the channels 3 over the cross-section of the honeycomb monolith 11, various alternatives are available. On one hand, the height of capillary rise 20 can be controlled solely through the length of time that it is brought into contact with the dosing element 7. An interruption of the capillary action inside the channels 3 through the use of passivation media (oils and/or waxes or the like) or the configuration of microstructures also exist. For wetting the honeycomb structure 11 with the adhesive 4, the channels 3 are aligned parallel to an axis 13 and, then, also moved toward the dosing element 7 parallel to the axis 13, until the end face 14 encounters an outlet side 9 of the dosing element 7. In the process, the adhesive 4 in the embodiment shown flows in the direction of flow 19 (indicated by the arrows) counter to the direction of gravitational force 31.

The dosing element 7 represented in FIG. 1 is of a honeycomb configuration and has an inlet side 8 and an outlet side 9. Adhesive 4 enters the dosing element 7 through the inlet side 8 and is uniformly deliverable to the honeycomb monolith 11 through the outlet side 9. For such a purpose, the dosing element 7 has feed lines 12 running substantially parallel to an axis 13 and extending up to a substantially planar outlet side 9. The feed lines 12 are manufactured by metal foils 22, which are at least partially structured. Flat and/or corrugated metal foils, which are layered and/or wound and then disposed in a casing pipe 29, are especially suitable for such a purpose. In the embodiment shown, the casing pipe 29 on one side extends up to the outlet side 9, but, on the opposite side, the casing pipe 29 projects over the inlet side 8. It is clear from this that the lengths of the feed lines 12 and of the metal foils 22 and the casing pipe 29 may be configured differently and independently of one another in the direction of the axis 13. In addition, the outlet side 9 is provided with a cover 24, in particular, a velvet cover, pervious to the adhesive 4. The cover is, preferably, fixed directly to or on the casing pipe 29, the cover 24 resting directly on the outlet side 9 or, for example, being pressed against the outlet side 9 only by contact with the honeycomb monolith 11.

In the embodiment shown, the dosing element 7 stands in an adhesive reservoir 21 at least partially filled with an adhesive 4. The adhesive reservoir 21 may, in principle, be configured with an open or closed container. In the embodiment, it is an open container, the outlet side 9 protruding by a projection height 33 from the adhesive 4. To ensure that sufficient adhesive reaches the interior of the feed lines 12 through the inlet side 8, a corrugated layer 28, which provides passages between the casing pipe 29 and the bottom of the adhesive reservoir 21, at least in sections, is provided on the bottom of the adhesive reservoir 21. Such a corrugated layer 28 may be made, for example, from a metal foil, like that used for the manufacture of the dosing element and/or the metal structure, greater foil thicknesses, preferably, being used so that the layer 28 will withstand the weight of the dosing element and the honeycomb monolith 11 and the contact pressure between these components. As an alternative to the corrugated layer 28, any other spacers that permanently ensure the flow of adhesive 4 through the inner areas of the dosing element 7 may, naturally, also be used.

FIGS. 2A to 2E show a diagrammatic sequence for a development of the method according to the invention. The first stage of the method, illustrated in FIG. 2A, lies in stacking and/or winding flat and corrugated walls 2 to form the metal structure 1. The separate walls 2 are, preferably, disposed cylindrically and are integrated in a correspondingly shaped housing.

Figure 2A:
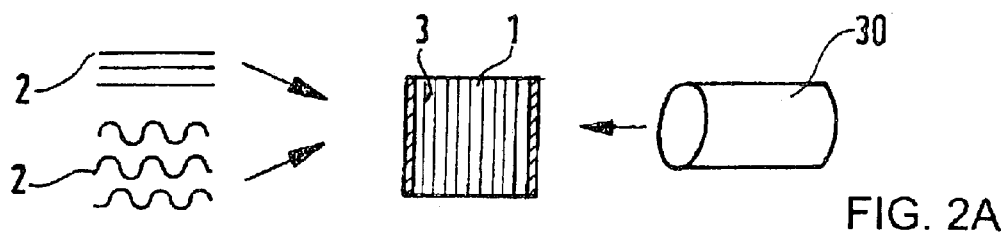
FIGS. 2A to 2E are diagrammatic cross-sectional views of sequence for a development of the method for the manufacture of a catalyst carrier substrate.
Figure 2B:
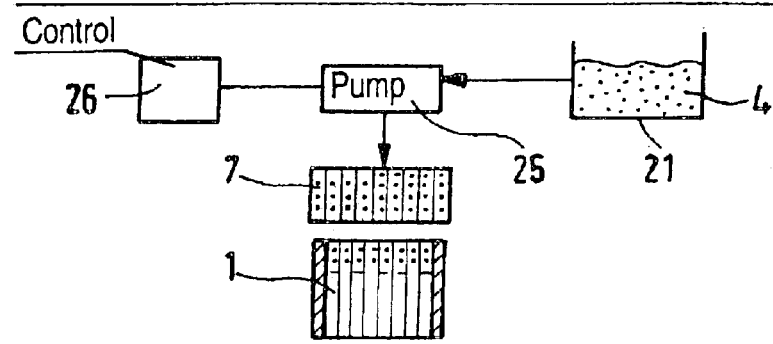
Figure 2C:
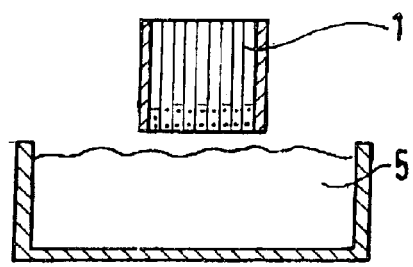
Figure 2D:
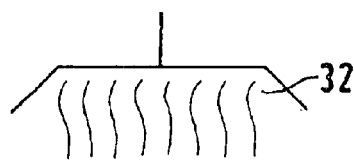

In the second stage of the method illustrated in FIG. 2B, the metal structure 1 is at least partially wetted with an adhesive 4. The device shown includes a dosing element 7, which is connected by way of a pumping facility 25 to an adhesive reservoir 21. A control unit 26 ensures that the required quantity of adhesive is introduced into the channels of the metal structure 1. In the embodiment shown, the adhesive 4 is delivered parallel and counter to the direction of gravitational force.

The third stage of the method is a soldering step. See FIG. 2C. In this stage, the metal structure 1 is brought into contact with the solder 5 so that the solder 5 adheres to the adhesive 4 inside the channels 3. The metal structure 1, now provided with solder 5, is, then, heated in an oven 32, the solder 5 being melted and constituents of the adhesive 4 being volatilized. See FIG. 2D. The soldering process is performed, in particular, as a high-temperature vacuum soldering process.

Figure 2E:
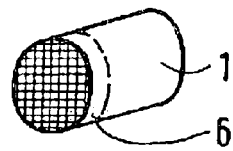

As shown in FIG. 2E, once the metal structure 1 has cooled and the solder 5 has resolidified in the contact areas, soldered connections 6 are formed at the desired points of the metal structure 1, which will withstand even the thermal and dynamic loads in the exhaust system of mobile internal combustion engines such as compression ignition and spark-ignition engines.

Figure 3:
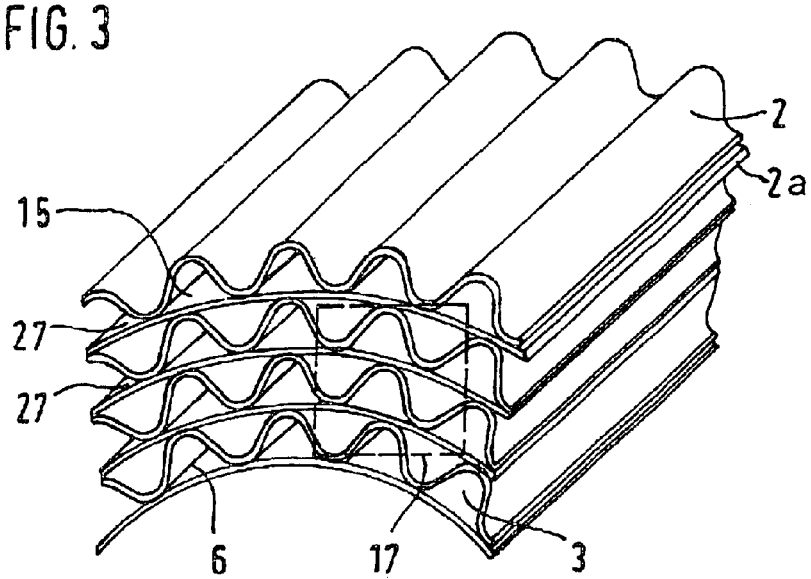
FIG. 3 is a fragmentary, perspective view of a detail of a metal structure of FIG. 1.

FIG. 3 shows a diagrammatic, perspective view of a detail of the metal structure 1, which is formed with separate, flat, and corrugated walls 2. The configuration of the walls 2 produces channels 3 through which an exhaust gas, for example, can flow. The number of channels 3 over a predefined area is, here, termed the channel density 17, which is, preferably, expressed in cells per square inch (cpsi). In stacking and winding the flat and corrugated walls 2, contact points between them are defined at which, preferably, exclusively joined connections 6 are to be produced. The channel cross-sectional shape 15 results from placing a corrugated wall 2 and a flat one 2a one on top of another, spandrels 27 being formed in the contact areas, which promote the capillary action.

Figure 4:
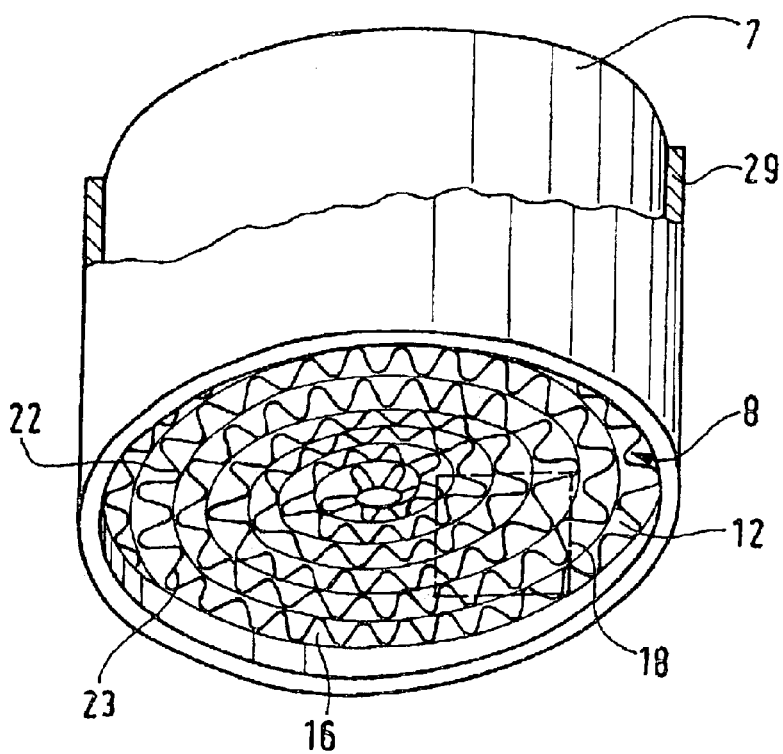
FIG. 4 is a fragmentary, perspective view of an embodiment of the dosing element of FIG. 1.

FIG. 4 shows a diagrammatic, perspective view of a dosing element 7, which is formed from metal foils 22, which are disposed in a casing pipe 29. Here, a flat and a corrugated metal foil 22 have been spirally wound, producing feed lines 12 with a feed line cross-sectional shape 16. The metal foils 22 have a foil thickness 23, which is, preferably, less than 15 μm so that feed line densities of up to 2000 cpsi are possible. The dosing element 7 is standing in an adhesive reservoir 21, as represented in FIG. 1, so that the adhesive 4 passes into the feed lines 12 through the inlet side 8 of the dosing element 7.

Figure 5:
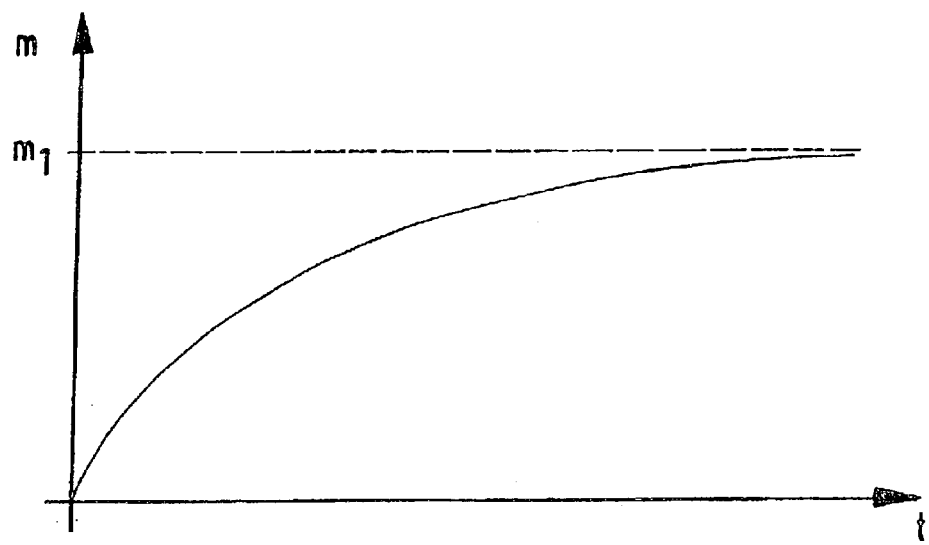
FIG. 5 is a graph illustrating adhesive absorption of the metal structure according to the invention over the adhesive application time.

FIG. 5 shows a diagram of the adhesive absorption as a function of the adhesive application time, that is to say, the time in which adhesive is delivered to the metal structure. In such a case "m" is the quantity of adhesive that the metal structure has already absorbed. The adhesive application time starts when the metal structure touches the outlet side of the dosing element. It can clearly been seen from FIG. 5 that the rate at which the quantity of adhesive is provided in the metal structure is, at first, relatively high, and then slows and, finally, runs toward a limit "$m_1$". The limit "$m_1$" represents in practical terms the maximum quantity of adhesive that the metal structure can absorb. Such a quantity may relate, on one hand, to the overall length of the channels, but the same is also true in the case of adhesive application up to a predetermined height of capillary rise that does not extend over the axial length of the channels. The shape of the curve shown is only diagrammatic, the precise shape being dependent, in particular, on the configuration of the channel cross-sectional shape (in particular, of the spandrels), the adhesive used, the ambient conditions, and similar, relevant factors.

Figure 6:
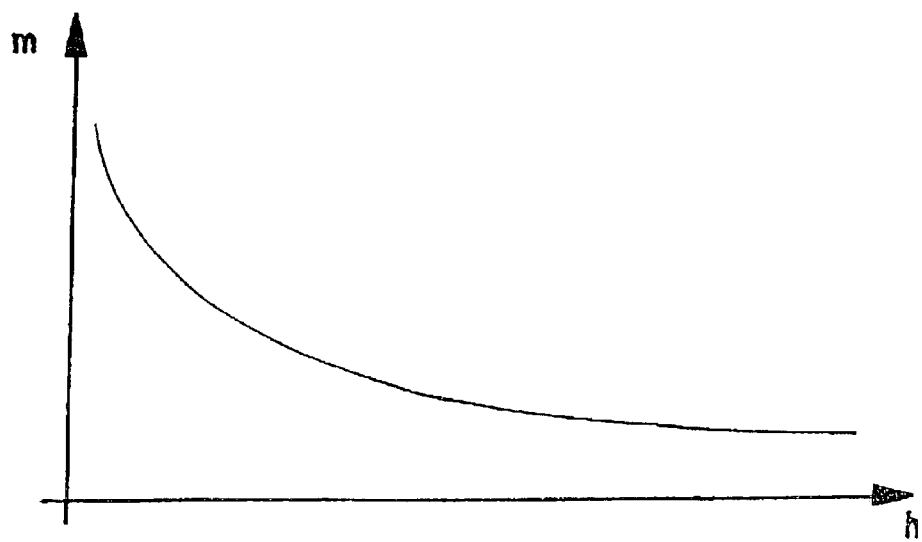
FIG. 6 is a graph illustrating an adhesive supply as a function of the projection height of the dosing element according to the invention.

FIG. 6 shows a diagram of the adhesive supply "m" as a function of the projection height "h" (corresponds to reference number 33 in FIG. 1). It will be seen here that take-up of the supply of adhesive is promoted if the outlet side 9 of the dosing element 7 projects further from the adhesive 4. This means that, for metal structures 1, which are to have extensive connecting areas, a configuration of the dosing element 7 must be selected in which this projects only slightly above the surface of the adhesive. The projection height usually lies in a range between 5 mm and 70 mm, preferably, between 30 mm and 60 mm.

The method according to the invention and the device proposed provide simple solutions to all the technical problems stated in the introduction. The production of metal catalyst carrier substrates, in particular, is, consequently, simplified and the process rendered reliable so that even future compliance with the latest and most stringent exhaust directives is ensured. Especially long life cycles are now possible so that an environmentally sound and automated cleaning and refilling of the carrier substrate with washcoat and/or catalysts after a certain service life in the exhaust system can be guaranteed.

We claim:

1. A method for manufacturing a metal structure having separate walls forming channels through which a fluid can flow, which comprises:

at least partially wetting walls inside the channels with an adhesive by performing a dosed delivery of the adhesive with at least one honeycomb configured dosing element having an inlet side and an outlet side and being connected to the adhesive, the adhesive entering the dosing element through the inlet side and being uniformly distributed into the channels through the outlet side;

subsequently contacting the metal structure with a solder adhering to the adhesive; and carrying out a heat treatment to form soldered connections between the separate walls.

2. The method according to claim 1, which further comprises:

providing the metal structure as a honeycomb monolith;

forming the walls with at least partially structured sheet metal foils; and at least one of stacking and winding the sheet metal foils for the honeycomb monolith to define the channels.

3. The method according to claim 1, which further comprises:

providing the dosing element with feed lines substantially parallel to an axis; and aligning the channels of the metal structure parallel to the axis before the metal structure is brought into contact with the outlet side of the dosing element.

4. The method according to claim 2, which further comprises:

providing the dosing element with feed lines substantially parallel to an axis; and aligning the channels of the metal structure parallel to the axis before the metal structure is brought into contact with the outlet side of the dosing element.

5. The method according to claim 1, wherein:

the metal structure has at least one end face with a channel density;

the channels adjoin the at least one end face; and the dosing element has a feed line density at least equal to the channel density.

6. The method according to claim 1, which further comprises actively pumping the adhesive into the inlet side of the dosing element.

7. The method according to claim 1, wherein a direction of flow of the adhesive in the dosing element is in a direction of gravitational force.

8. The method according to claim 1, which further comprises regulating a height of capillary rise of the adhesive in the channels of the metal structure by a periodic contact with the dosing element.

9. The method according to claim 1, which further comprises regulating a height of capillary rise of the adhesive in the channels of the metal structure by a periodically contacting the metal structure with the dosing element.

10. A device for wetting a metal structure with an adhesive, comprising:

an adhesive reservoir for supplying the adhesive; and at least one honeycomb-shaped dosing element having an inlet side and an outlet side through which the adhesive can flow, said dosing element:

being fluidically connected to said adhesive reservoir;

receiving the adhesive through said inlet side; and uniformly delivering the adhesive to the metal structure through said outlet side.

11. The device according to claim 10, wherein:

said outlet side is substantially planar; and said dosing element has:

an axis; and feed lines running substantially parallel to said axis and extending up to said outlet side.

12. The device according to claim 11, wherein said dosing element has a feed line density between approximately 200 cpsi and 2000 cpsi.

13. The device according to claim 11, wherein said dosing element has a feed line density between approximately 600 cpsi and 1600 cpsi.

14. The device according to claim 11, wherein said dosing element has at least partially structured metal foils forming said feed lines through which the adhesive can flow.

15. The device according to claim 14, wherein said metal foils have a foil thickness between approximately 8 $\mu$m and 80 $\mu$m.

16. The device according to claim 14, wherein said metal foils have a foil thickness between approximately 8 $\mu$m and 50 $\mu$m.

17. The device according to claim 14, wherein said metal foils have a foil thickness between approximately 8 $\mu$m and 30 $\mu$m.

18. The device according to claim 14, wherein said metal foils have a foil thickness between approximately 12 $\mu$m and 20 $\mu$m.

19. The device according to claim 10, wherein:

said dosing element has a cover pervious to the adhesive; and said cover extends over said outlet side.

20. The device according to claim 10, including a pumping facility fluidically connected to said adhesive reservoir and to said dosing device and delivering the adhesive from said adhesive reservoir to said dosing device.

21. The device according to claim 10, including a pumping facility delivering the adhesive from said adhesive reservoir to said dosing device.

22. The device according to claim 10, including a control facility regulating a quantity of the adhesive delivered to said dosing element.

23. The device according to claim 12, including a control facility connected to said pumping facility and regulating a quantity of the adhesive delivered to said dosing element.

24. A device for wetting a metal structure with an adhesive, comprising:

an adhesive reservoir for supplying the adhesive; and at least one moveable honeycomb-shaped dosing element having an inlet side and an outlet side through which the adhesive can flow, said dosing element:

being selectively fluidically connected to said adhesive reservoir;

receiving the adhesive through said inlet side; and uniformly delivering the adhesive to the metal structure through said outlet side.

* * * * *